W. E. LAWRENCE.

Curry-Comb.

No. 6,605. Reissued Aug. 24, 1875.

Attest:
H. W. Shockmorton.
C. E. Lusby

Inventor:
Wm. E. Lawrence
by Wm. H. Heinckel
Asso. Atty.

N. PETERS, PHOTO-LITHOGRAPHER, WASHINGTON, D. C.

UNITED STATES PATENT OFFICE.

WILLIAM E. LAWRENCE, OF NEW YORK, N. Y., ASSIGNOR TO THE LAWRENCE CURRY-COMB COMPANY.

IMPROVEMENT IN CURRY-COMBS.

Specification forming part of Letters Patent No. 150,585, dated May 5, 1874; reissue No. 6,605, dated August 24, 1875; application filed March 23, 1875.

*To all whom it may concern:*

Be it known that I, WILLIAM E. LAWRENCE, of the city and State of New York, have invented an Improvement in Curry-Combs, of which the following is a specification:

Curry-combs have been made of trough-shaped plates, with comb-teeth on the edges of the flanges, and these have been connected at the ends, to form open-backed curry-combs, and handles have been connected to the back of the curry-combs by means of metallic shanks; but these are liable to become bent and broken in use.

My present invention relates to a peculiar manner of constructing the plates for strengthening the combs, and also to the means for connecting the handle to the comb, to prevent the shank bending when in use.

The plates with comb-teeth upon the edges are strengthened by adjacent narrower plates without teeth. To facilitate this construction, the comb-plates are made of a trough shape, with the toothed flange wider than the plain flange.

The principal strain in using a curry-comb is in a vertical plane passing through the handle and shank.

A comb has been made with two wires passing from the handle to the first comb-plate; but these did not strengthen such shank in the direction before named.

I make use of a brace passing diagonally from the handle to the back of the comb, and in a plane perpendicular, or nearly so, to the back of the comb, said brace being employed in combination with the ordinary shank or connection from the handle to the comb.

Figure 1:
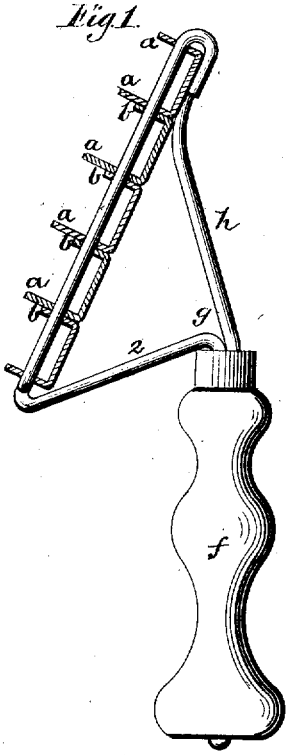
Figure 2:
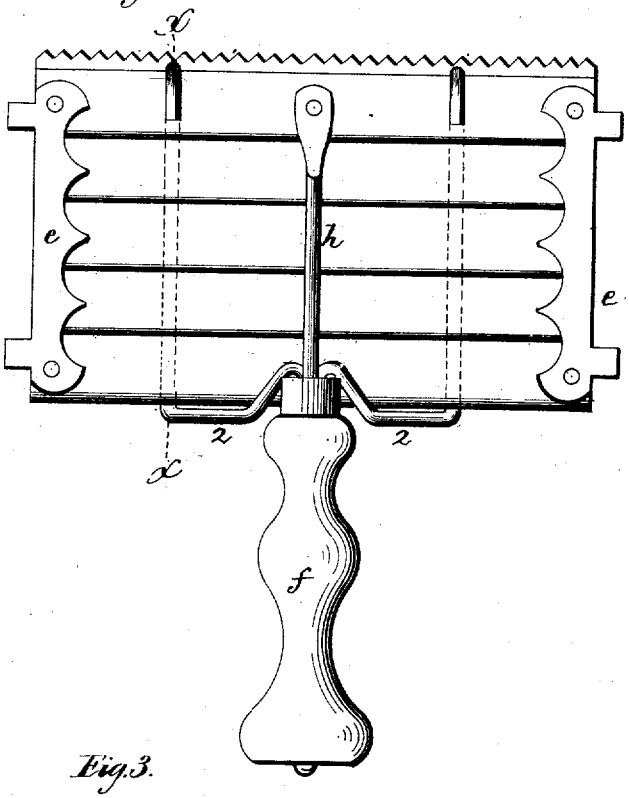
Figure 4:
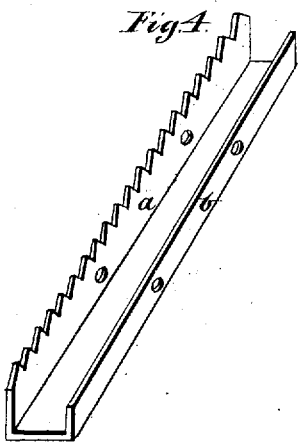
Figure 3:
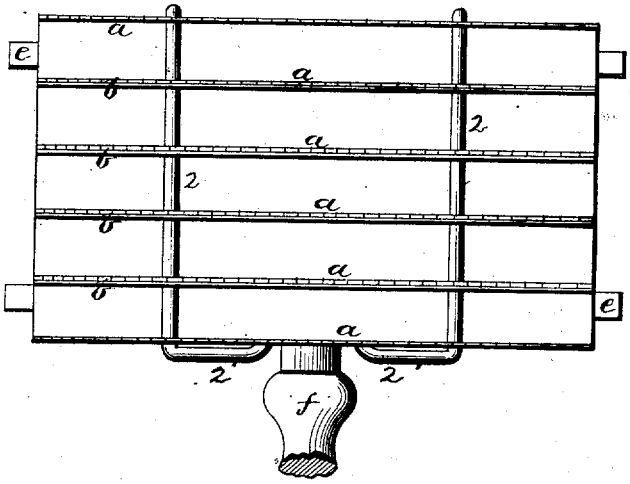

In the drawing, Figure 1 is a section at the line *x x*, and Fig. 2 is a back view, of the curry-comb. Fig. 3 shows the face of the comb, and Fig. 4 is a perspective view of one of the trough-shaped comb-plates.

The comb-plates are made with flanges, in a trough shape. The flanges *a* are the widest, and provided with teeth upon their edges, and the flanges *b* are narrower and plain; and these plates are placed together, with the narrow flanges *b* against the wide flanges *a*, so that the toothed flanges are strengthened by the plain flanges.

Where the comb is made with a closed back, some of the comb-plates will have teeth on both edges.

The knockers *e* are attached at the ends of the comb-plates, and serve their usual purpose. The handle *f* is connected to the comb-plates, and for this purpose the shank *g* is extended in the form of two wires, 2 2, passing through holes in the flanges *a* and *b* of the comb-plates, and turned back at their ends at the side of the front comb-plate; and a brace, *h*, extends from the shank toward the front of the comb, and strengthens the shank *g*, so that it is not liable to bend or break while in use.

I claim as my invention—

1. The curry-comb containing comb-plates and contiguous plates without teeth, to strengthen the comb-plates, substantially as specified.

2. A comb-plate for a curry-comb, made in a trough shape, with teeth upon the wider flange *a*, and the other flange, *b*, plain, substantially as specified.

3. The wires 2 2, extending from the shank of the handle through the flanges of the comb-plates, and returned at the front edge of the curry-comb, substantially as set forth.

4. The combination, with a curry-comb having a handle connected by a shank to the comb, of a brace, *h*, extending diagonally from the handle toward the front edge of the comb, for the purposes and substantially as set forth.

Signed by me this 19th day of March, 1875.

Witnesses: WM. E. LAWRENCE.

GEO. T. PINCKNEY,

CHAS. H. SMITH.